May 8, 1945.   H. S. CAMPBELL   2,375,465
ROTATIVE WINGED AIRCRAFT
Filed June 19, 1941   2 Sheets-Sheet 2
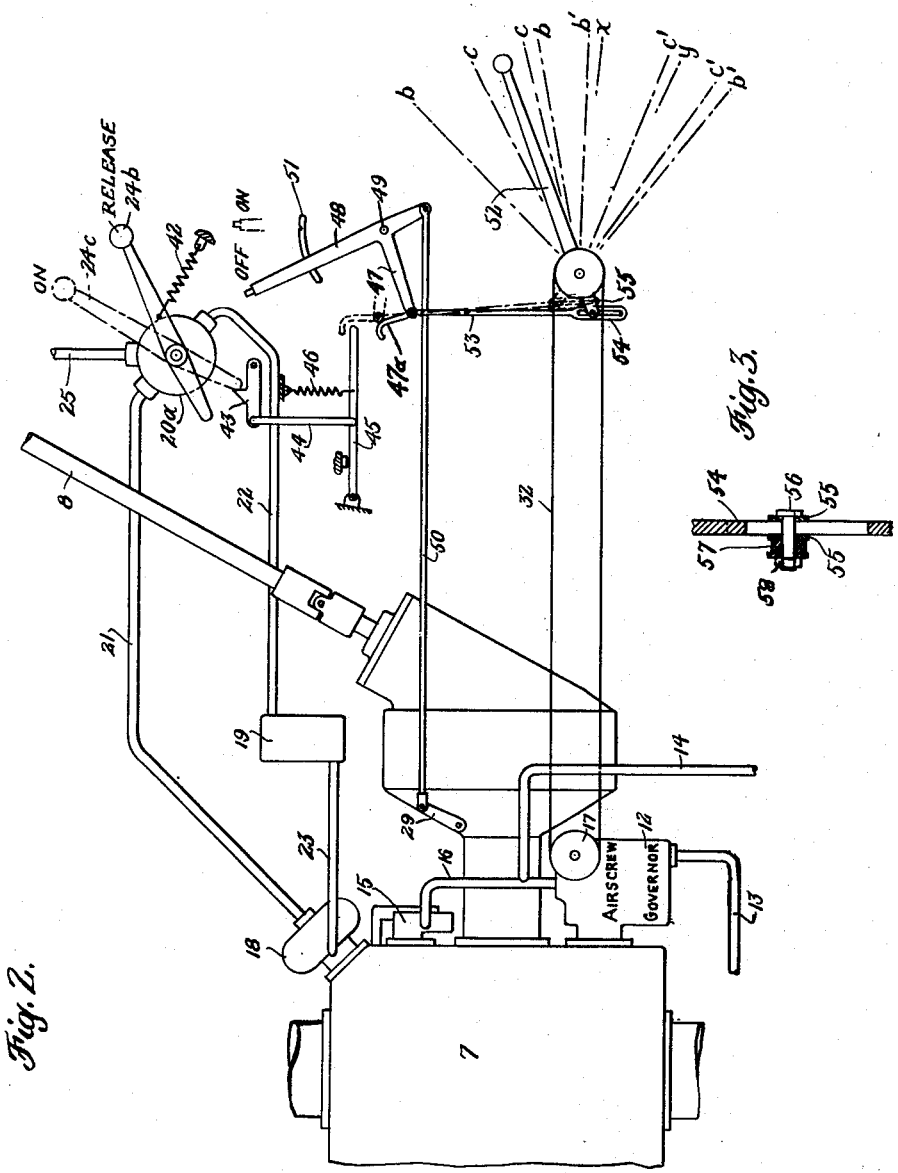
INVENTOR.
Harris S. Campbell
BY
ATTORNEYS Patented May 8, 1945

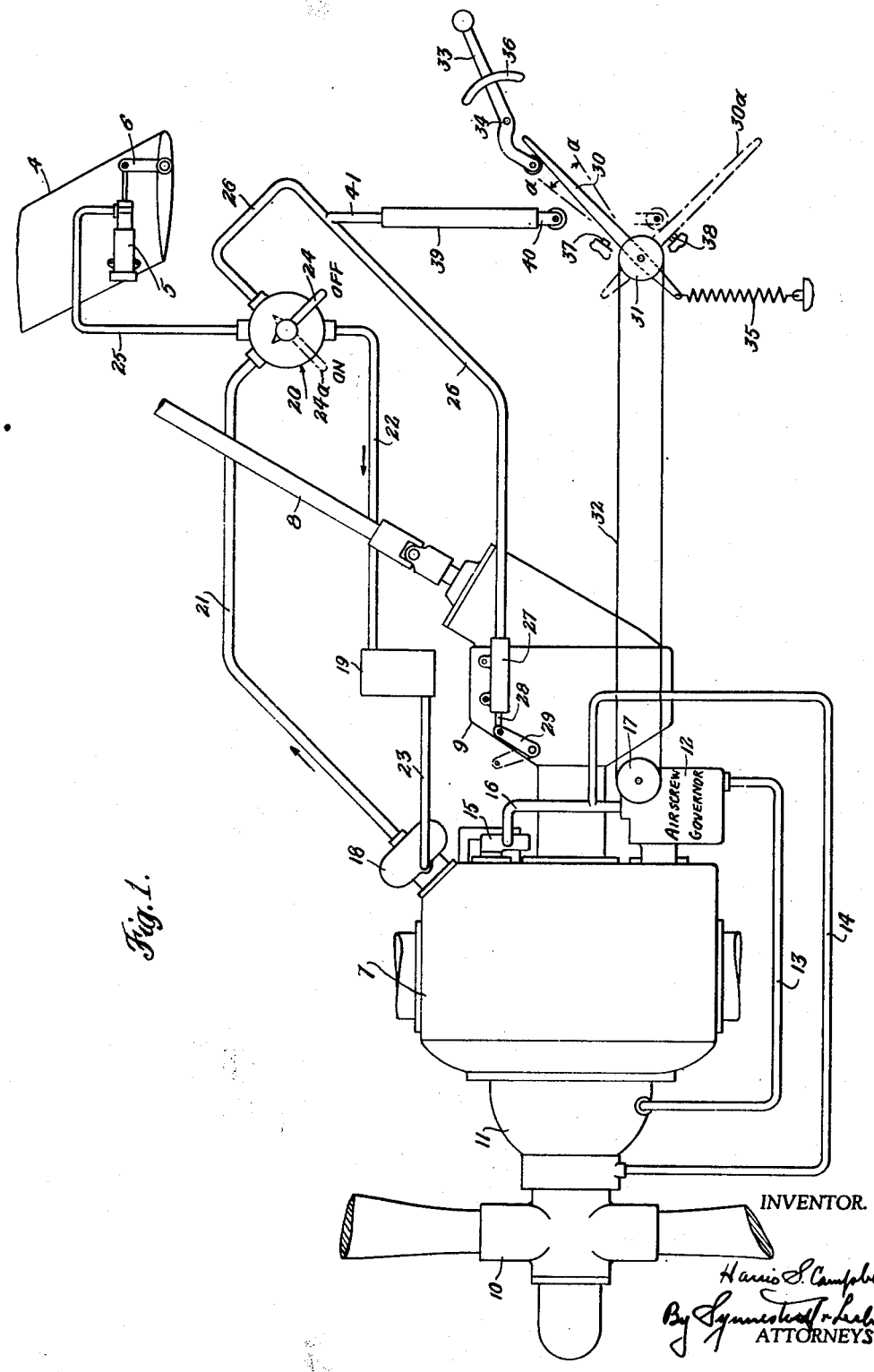

2,375,465

UNITED STATES PATENT OFFICE 2,375,465

ROTATIVE WINGED AIRCRAFT

Harris S. Campbell, Bryn Athyn, Pa., assignor to Autogiro Company of America, Philadelphia, Pa., a corporation of Delaware Application June 19, 1941, Serial No. 398,755

9 Claims. (Cl. 244—18)

This invention relates to rotative winged aircraft, and is particularly concerned with the initiation of rotation of the sustaining wings prior to making a take-off. Still further, the invention is of especial utility in an aircraft capable of "direct" or substantially vertical take-off.

For the purpose of effecting direct take-off, an aircraft of the type here involved is equipped with a variable pitch sustaining rotor which is adapted to be driven while the machine is at rest on the ground to a high number of revolutions, preferably in excess of normal flight R. P. M., the rotor blade pitch angle being maintained at a low value, desirably approximating zero pitch, so as to store a considerable quantity of kinetic energy. This energy may be released to effect direct take-off by raising the blade pitch, this general type of take-off maneuver being described more fully in copending application of Juan de la Cierva, Serial No. 738,349, filed August 3, 1934.

Certain features of the invention are particularly useful where the sustaining rotor of the aircraft (at or just before the take-off) is disconnected from the driving engine and is actuated in flight autorotationally or aerodynamically, for which purpose the aircraft is equipped with a propulsive airscrew for inducing translational flight.

In accordance with the present invention, not only the sustaining rotor, but also the propulsive airscrew of such an aircraft, is capable of variation in pitch setting, and controls are provided by which during acceleration of the rotor while on the ground in preparation for take-off, the propulsive airscrew pitch is reduced, thereby reducing the power absorbed by the airscrew and making an equivalent increase of power available for transmission to the rotor for starting purposes.

The present invention contemplates the provision of a control system ensuring rapid airscrew pitch increase following the rotor acceleration period, in order to establish translational flight speed at a rapid rate and thereby avoid loss of altitude at the end of the direct take-off maneuver.

The invention also contemplates the employment of an adjustable airscrew pitch governor operating to stabilize the engine speed by increase or decrease of the airscrew pitch with increase or decrease, respectively, of the engine speed, and the provision of means interrelating the adjusted equilibrium speed setting of said governor with the means for varying the sustaining rotor pitch or with the mechanism for connecting and disconnecting the rotor drive, or both.

It is also contemplated that the interrelation of controls provides for reduction of airscrew pitch only to that extent necessary to release the power required to accelerate the rotor up to the take-off speed, provision being made for automatic increase of the airscrew pitch upon increase of rotor blade pitch to effect the take-off. In this way a minimum of time is required for development of full airscrew thrust, which is of importance in eliminating loss of altitude at the end of the direct take-off maneuver.

The foregoing features are also of advantage and importance since the increase of airscrew pitch at the time of making a take-off is preferably accompanied by disconnection of the rotor drive. In the absence of such airscrew pitch increase, disconnection of the rotor drive would otherwise result in undesirable overspeeding of the engine.

How the foregoing and other objects and advantages are attained will be apparent from the following description, referring to the accompanying drawings, in which—

Figure 1 is a diagrammatic view of certain elements and devices of a rotative winged aircraft arranged in accordance with the present invention and provided with the control system herein contemplated;

Figure 2 is a view similar to Figure 1 but illustrating a modification; and

Figure 3 is a detailed view of one part of the control system of Figure 2.

In Figure 1, a rotor blade appears at 4, it being understood that the rotor would ordinarily incorporate a plurality of such blades pivotally connected with a common rotative hub, as by "flapping" and "drag" pivots, as well as a pitch change mounting, examples of which appear in Ray Patent 2,216,163, issued October 1, 1940. The pitch angle of all blades may be simultaneously varied in the same sense by means of hydraulic cylinder and piston devices one of which appears at 5, connected with the blade through an arm 6, this general type of blade pitch control unit also being disclosed in said Ray Patent.

The rotative hub is adapted to be driven from engine 7, as by drive shafting 8 and a disconnectible clutch which may appropriately be enclosed within housing 9. Free overrunning of the rotor with respect to the drive may be assured by introduction of a freewheel clutch at any appropriate point in the drive system.

Engine 7 also serves to drive the propulsive airscrew 10, the blade pitch of this airscrew being controllable, for example, by hydraulic mechanism enclosed at 11, in a manner well understood in this art.

The invention employs an airscrew pitch governor 12 which, per se, may be of known type, the governor having a driving connection with the engine and being coupled with the pitch control mechanism 11 by pipes 13 and 14. The governor is supplied with actuating fluid from a pump 15 through a pipe 16. The pump 15, i. e., the source of fluid pressure, may comprise the normal lubrication pump for the engine.

The pitch control and governor mechanism for the airscrew provide for substantially constant engine speed by increase of airscrew pitch upon increase of engine speed, and decrease of airscrew pitch upon decrease of engine speed. In accordance with the invention, the equilibrium position of the governor is adjustable by means of a wheel 17 and control connections hereinafter described, so that the equilibrium speed of the engine may be varied.

Control of the pitch angle of the rotor blades is also secured through a hydraulic system, this system comprising a pump 18, reservoir 19 and main control valve 20. Pressure is delivered from the pump to the control valve through pipe 21 and may be returned to the reservoir 19 through pipe 22, the reservoir also having a connection 23 with the intake side of the pump, to complete the circuit. It may here be mentioned that a control valve of the general type shown at 20 is more fully disclosed in copending application of Agnew E. Larsen, Serial No. 363,593, filed October 31, 1940, and issued July 20, 1943, as Patent No. 2,324,588. The structure of this valve need not be considered in detail herein, but it is noted that movement of the valve handle 24 in a clockwise direction, when viewed as in Figure 1, to the vertical position, admits pressure fluid to pipe 25 which is extended upwardly for connection with the cylinder and piston devices 5 which are associated with the rotor blades, thereby actuating arms 6 in a sense to decrease the rotor blade pitch. Movement of the blades 4 to increased pitch position (upon relief of the fluid pressure) for direct take-off may be effected in a number of different ways, as by the employment of a worm thread pitch mounting of the type shown in the Ray patent hereinbefore referred to, said worm thread mounting being so oriented that the action of centrifugal force on the blades moves them to increased pitch position upon relief of the fluid pressure.

Control handle 24 of valve 20 may also be further rotated in a clockwise direction to the position indicated at 24a, in which fluid pressure is not only delivered to pipe 25 but further to pipe 26, which is extended to a cylinder and piston device 27. The piston stem 28 of this device is coupled with an arm 29 for actuating the rotor drive clutch enclosed within the housing 9. Introduction of fluid into piston 27 engages the rotor driving clutch and relief of pressure fluid through pipe 26, valve 20 and pipe 22 (as occurs with the operating handle 24 in the position shown in full lines) results in disconnection of the rotor clutch.

The two fluid pressure control systems described above (one for the airscrew pitch, and the other for the rotor pitch and rotor clutch) are arranged for interrelated operation in the manner now to be described.

A pivoted control member or element 30 for the airscrew pitch governor is connected with that governor by means of a pulley 31 and an endless cable 32 passing not only over pulley 31 but over the governor pulley 17. The angularly offset lines a—a indicate a flight range of adjustment of member 30 and thus of the equilibrium pitch setting of the airscrew 10. Adjustments within this range may be made by a control lever 33, pivoted at 34, one end of the lever bearing against the upper side of member 30. A return spring 35 serves to maintain member 30 in contact with lever 33. Any desired adjustment of the lever 33 may be retained as by a ratchet or friction quadrant 36. Movement of the control member 30 in an upward direction lowers the equilibrium engine speed setting, a stop 37 being employed to limit the movement in this direction.

Member 30 may also be angularly displaced considerably below the normal flight range a—a, for example to the position indicated in dotted lines at 30a, in which the member bears against stop 38. This lower position of member 30 corresponds to a very high equilibrium engine speed (low airscrew pitch), but will not result in racing of the engine since that setting is employed only when the engine is also coupled to drive the rotor, as will further appear.

For the purpose of effecting movement of member 30 to position 30a, a fluid cylinder 39 is provided, having a piston 40 projecting from the lower end thereof in position to bear against the upper side of member 30. Fluid may be introduced into cylinder 39 through connection 41 formed as a branch of pipe 26 hereinbefore described.

With the system of Figure 1, it is contemplated that a take-off be effected in the following manner:

With the engine 7 idling, the control handle 24 of valve 20 is moved in a clockwise direction, which movement initially introduces pressure fluid to pitch control cylinder 5, thereby reducing the rotor blade pitch, and then introduces pressure fluid to pipe 26, and to branch 41, thereby engaging the rotor driving clutch and moving the piston 40 downwardly against arm 30 to carry the latter to the position indicated at 30a. In this position the pitch of the airscrew is substantially reduced from the normal flight range (the setting corresponding to a high equilibrium speed of the engine), in view of which, in the absence of the drag of the rotor (now connected with the engine) the engine would operate at a considerable overspeed. Effectively, therefore, reduction of the airscrew pitch releases engine power for transmission to the rotor, and the engine throttle is now opened in order to increase engine speed and thus accelerate the rotor to the R. P. M. desired for take-off.

When the take-off R. P. M. is attained, the control handle 24 of valve 20 may again be returned to the full line position, thereby releasing the pressure in pipes 25, 26 and 41. The effect of this is to disconnect the rotor drive clutch and permit the rotor blade pitch to increase, and still further to cause control member 30 to move upwardly (under the action of spring 35) to the position of adjustment in the normal flight range established by the setting of lever 33. The consequent increase in airscrew pitch absorbs the power of the engine which is no longer being transmitted to the rotor and thereby prevents substantial overspeeding of the engine.

The increase of rotor blade pitch converts the kinetic energy stored in the rotor to lift and the machine commences the direct take-off maneuver, during which the airscrew is rapidly developing its maximum thrust, so as to establish the translational flight speed necessary to avoid loss of altitude. It will be noted that the prevention of overspeeding of the engine is accomplished without the necessity of adjusting the engine throttle.

In the modification of Figure 2, many of the parts are the same as described above in connection with Figure 1. The valve 20a, however, is employed only for control of rotor blade pitch by admitting and releasing pressure fluid to and from pipe 25. The operating handle 24b of this valve has only two positions, and is biased by a spring 42 to "release" position, as shown in full lines, in which pipe 25 is connected with the return line 22.

A pivoted latch 43 serves to retain lever 24b in the "on" position, as shown at 24c in dot and dash lines, in which pressure is delivered from pipe 21 to pipe 25, to reduce the rotor blade pitch, as before. Latch 43 is coupled by link 44 with a pivoted lever 45 which is urged toward "latch-engaged" position by a spring 46. The free end of arm 45 is adapted to be depressed by a trip member 47a carried by an arm 47 rigid with control lever 48 which is pivoted at 49 and is coupled with the clutch actuating arm 29 by a push rod 50. Clutch operating lever 48 may be retained in clutch "on" or clutch "off" positions by means of a latch cooperating with notches formed in the quadrant 51. With this arrangement, the rotor clutch is adapted to be engaged when the lever 48 is moved to the "on" position. At this time trip member 47a overlies the free end of lever 45 (as indicated in dotted lines), and the latch 43 engages control lever 24b in its "on" position. When lever 48 is moved to "off," the trip 47a moves lever 45 downwardly thereby disengaging latch 43 and permitting lever 24b to return to "release" under the influence of spring 42.

The control member 52 for adjustment of the airscrew pitch governor is connected with a link 53 depending from arm 47 of the clutch control lever. As best seen in Figure 3, the connection of control 52 with link 53 includes a slotted yoke 54 formed at the lower end of link 53, this yoke being embraced by forks 55—55 projecting from control member 52. A pin 56 passes through these parts, including the slot in yoke 54, and a rubber cushion 57 exerts pressure to cause forks 55—55 to frictionally engage the yoke 54, thereby to maintain any adjusted setting of control member 52. A nut 58 may be employed to adjust the compression of the rubber and thereby the frictional engagement of the parts.

The general operation of the control system of Figure 2 is similar to that described above. In fact, if desired, this arrangement may be operated, for the take-off, in the same manner as that specifically set out with relation to Figure 1. Thus, with the engine idling, the clutch control lever 48 may be moved to the "on" position and the valve control handle 24b may also be moved to the "on" position (as at 24c), the latter being retained by latch 43. The movement of clutch control lever 48 just described also causes the control member 52 for the airscrew governor to move downwardly, under the influence of upward movement of link 53, thereby causing a reduction in airscrew pitch.

The engine throttle may now be opened progressively in order to accelerate the rotor and, upon attaining the desired rotor R. P. M., the clutch control lever 48 may be moved to the "off" position, which disconnects the rotor drive clutch and trips lever 45 and latch 43, thereby permitting spring 42 to return the valve control handle 24b to "release," which effects a raising of the rotor blade pitch. At the same time this movement of the clutch control lever 48 moves the control member 52 for the airscrew governor upwardly, increasing the airscrew pitch, so as to absorb power which is no longer being transmitted to the rotor. Direct take-off is occurring at this time and the airscrew thrust rapidly picks up, so as to quickly establish translational flight speed.

The mechanism of Figure 2 is further capable of operation in a different manner, according to which the control (52) for the airscrew governor is employed as a jump-off control by using it to regulate the acceleration of the rotor, as will now be described. However, it is first pointed out that, as indicated at b—b, the range of possible manual adjustment of member 52 when the clutch lever 48 is in "off" position is greater than that normally required for flight adjustments, the latter range being indicated at c—c. When the clutch control lever 48 is moved to the "on" position, the entire manually adjustable range is shifted downwardly, as indicated at b'—b', the segment of this total manual range corresponding to flight adjustments also being shown at c'—c'.

With this form of control, take-off may be effected in the following manner:

With the engine idling, the rotor clutch is engaged and the rotor blade pitch reduced, and the control member 52 is set at a point, such as that indicated at x, at which (with the rotor load on the engine) the governor operates to limit the engine and airscrew speed to an R. P. M. appreciably below the maximum engine speed limit, this setting being maintained during the initial portion of the acceleration of the rotor. By way of example, the point x may desirably be that position in which (with the rotor load on the engine) the governor imposes an equilibrium speed at about 75% of maximum speed. It will be understood that without the drag of the rotor on the engine, this setting would result in substantial undesirable overspeeding of the engine, but this is prevented since the rotor drive clutch is at this time connected.

After acceleration of the rotor and engine up to a speed corresponding to point x, the pilot may then progressively lower control member 52 to a point such as that indicated at y which, in effect, reduces the airscrew pitch and thereby releases an increased portion of the power for delivery to the rotor. This causes further acceleration of the rotor, which can be controlled as desired, by the rate and the extent of downward movement of member 52. When the usual rotor tachometer indicates the attainment of the desired R. P. M. of the rotor, downward movement of member 52 is discontinued.

Upon the attainment of the desired rotor take-off R. P. M., the clutch control lever 48 is moved to the "off" position and the clutch is thereby disengaged, the rotor blade pitch increased and the control member 52 swung upwardly so that the manually controllable range again occupies its upper position. Since the point (for instance point y), to which member 52 was adjusted, normally lies within the flight adjustment range c—c, substantial overspeeding of the engine is prevented and the airscrew rapidly develops thrust in order to quickly establish translational flight.

By operating the mechanism in this way, relatively fine adjustments of the engine throttle are not required and, in addition, the airscrew pitch is reduced only to that value necessary to release sufficient power to bring the rotor up to the desired take-off R. P. M. Therefore, return of the airscrew pitch to the higher value and re-development of the airscrew thrust consumes a minimum of time, and it is assured that only a minimum of over-speeding of the engine will occur during the transition from rotor-driven condition to full-flight condition.

Normally, it is preferable to operate at full engine throttle during the latter part of the acceleration of the rotor preceding take-off. This practice is advantageous since, upon de-clutching, it is unnecessary to advance the throttle to secure rapid increase of airscrew thrust to the maximum obtainable. Utilizing maximum airscrew thrust during the take-off is of advantage since translational flight speed is thereby quickly established.

The arrangement of Figure 2 is capable of meeting varying operating conditions, such as wind velocity, etc., for which purpose the pilot may appropriately adjust the governor control member 52 throughout the wide range provided by the slot and pin interconnection between member 52 and link 53.

I claim:

1. In an aircraft having an engine and variable pitch sustaining rotor and propulsive airscrew both adapted to be driven by the engine, an adjustable airscrew pitch governor providing a substantially constant equilibrium engine speed for a given engine throttle setting by increase or decrease of airscrew pitch, means for varying the rotor pitch, and a common control system for adjusting the equilibrium engine speed established by the airscrew pitch governor and for actuating the means for varying the rotor pitch including operating connections providing for simultaneous decrease of rotor blade pitch and increase of the equilibrium speed setting of the airscrew governor.

2. In an aircraft having an engine and variable pitch sustaining rotor and propulsive airscrew both adapted to be driven by the engine, an adjustable airscrew pitch governor providing a substantially constant equilibrium engine speed for a given engine throttle setting by increase or decrease of airscrew pitch, means for varying the rotor pitch, a disconnectible rotor drive mechanism, and a common control system including operating connections providing for conjoint connection of the rotor drive mechanism with decrease of rotor blade pitch and increase of the equilibrium speed setting of the airscrew governor, and for conjoint disconnection of the rotor drive mechanism with increase of rotor blade pitch and decrease of the equilibrium speed setting of the airscrew governor.

3. In an aircraft having an engine, a sustaining rotor, and a variable pitch propulsive airscrew, the rotor and airscrew both being adapted to be driven by the engine, an adjustable airscrew pitch governor providing a substantially constant equilibrium engine speed for a given engine throttle setting by increase or decrease of airscrew pitch, a disconnectible rotor drive mechanism, a control member for adjusting the equilibrium speed setting of said governor, said member being manually adjustable through a limited range for control of the equilibrium setting in normal flight operation, a control device for connecting and disconnecting the rotor drive, and means associated with said member and said device providing automatically for adjustment of said member to an equilibrium speed setting above the flight range upon actuation of the control device to connect the rotor drive.

4. In an aircraft having an engine, a sustaining rotor, and a variable pitch propulsive airscrew, the rotor and airscrew both being adapted to be driven by the engine, an adjustable airscrew pitch governor providing a substantially constant equilibrium engine speed for a given engine throttle setting by increase or decrease of airscrew pitch, a disconnectible rotor drive mechanism, a control member for adjusting the equilibrium speed setting of said governor, said member being manually adjustable through a limited range, a control device for connecting and disconnecting the rotor drive, and means associated with said member and said device for shifting said manual adjustment range in a sense such that with the rotor drive connected the manual adjustment range comprehends relatively high equilibrium speed settings, and that with the rotor drive disconnected the manual adjustment range comprehends relatively low equilibrium speed settings.

5. In an aircraft having an engine and variable pitch sustaining rotor and propulsive airscrew both adapted to be driven by the engine, an adjustable airscrew pitch governor providing a substantially constant equilibrium engine speed for a given engine throttle setting by increase or decrease of airscrew pitch, a disconnectible rotor drive mechanism, a control member for adjusting the equilibrium speed setting of said governor, said member being manually adjustable through a limited range for control of the equilibrium setting in normal flight operation, a control device for connecting and disconnecting the rotor drive, means for varying the rotor blade pitch, and a control system associated with said member, said device and said means, and providing for conjoint reduction of rotor blade pitch, connection of the rotor drive and adjustment of said member to an equilibrium speed setting above the flight range.

6. In an aircraft having an engine and variable pitch sustaining rotor and propulsive airscrew both adapted to be driven by the engine, an adjustable airscrew pitch governor providing a substantially constant equilibrium engine speed for a given engine throttle setting by increase or decrease of airscrew pitch, a disconnectible rotor drive mechanism, a control member for adjusting the equilibrium speed setting of said governor, said member being manually adjustable through a limited range, a control device for connecting and disconnecting the rotor drive, means for varying the rotor blade pitch, and a control system associated with said member, said device and said means, and providing for conjoint reduction of rotor blade pitch, connection of the rotor drive clutch and adjustment of said member to a position such that the range of manual adjustment comprehends relatively high equilibrium speed settings, the control system further providing for conjoint increase of rotor blade pitch, disconnection of the rotor drive clutch and adjustment of said member to a position such that the range of manual adjustment comprehends relatively low equilibrium speed settings.

7. In an aircraft having an engine and variable pitch sustaining rotor and propulsive airscrew both adapted to be driven by the engine, means for varying the rotor blade pitch, a control member for varying the airscrew pitch, said member being manually adjustable over a limited range and being shiftable to move said range between a position providing high airscrew pitch settings and a position providing low airscrew pitch settings, and mechanism interrelating the operation of the means for varying the rotor blade pitch and of the said member, providing for shifting of said manual adjustment range to the position of high pitch settings upon increase of rotor blade pitch.

8. In an aircraft having an engine and variable pitch sustaining rotor and propulsive airscrew both adapted to be driven by the engine, means for varying the rotor blade pitch, a disconnectible drive for the rotor, a control member for varying the airscrew pitch, said member being manually adjustable over a limited range and being shiftable to move said range between a position providing high airscrew pitch settings and a position providing low airscrew pitch settings, and mechanism interrelating the operation of the means for varying the rotor blade pitch, of the disconnectible rotor drive, and of said shiftable member, providing for conjoint connection of the rotor drive, decrease of rotor blade pitch and shifting of said manual adjustment range to the position of low airscrew pitch settings, and for conjoint disconnection of the rotor drive, increase of the rotor blade pitch and shifting of said manual adjustment range to the position of high airscrew pitch settings.

9. In an aircraft having an engine, a variable pitch sustaining rotor unit and a variable pitch airscrew unit, both units being adapted to be driven by the engine, an adjustable pitch governor for one of said units adapted to maintain a substantially constant equilibrium engine speed for a given engine throttle setting by increase or decrease of the pitch of one of said units, means for varying the pitch of the other of said units, and a common control system for adjusting the equilibrium engine speed established by said pitch governor of the one unit and for actuating the means for varying the pitch of the other unit, including operating connections providing for simultaneous increase of the equilibrium speed setting of the governor of said one unit and decrease of the pitch of said other unit.

HARRIS S. CAMPBELL.